UNITED STATES PATENT OFFICE.

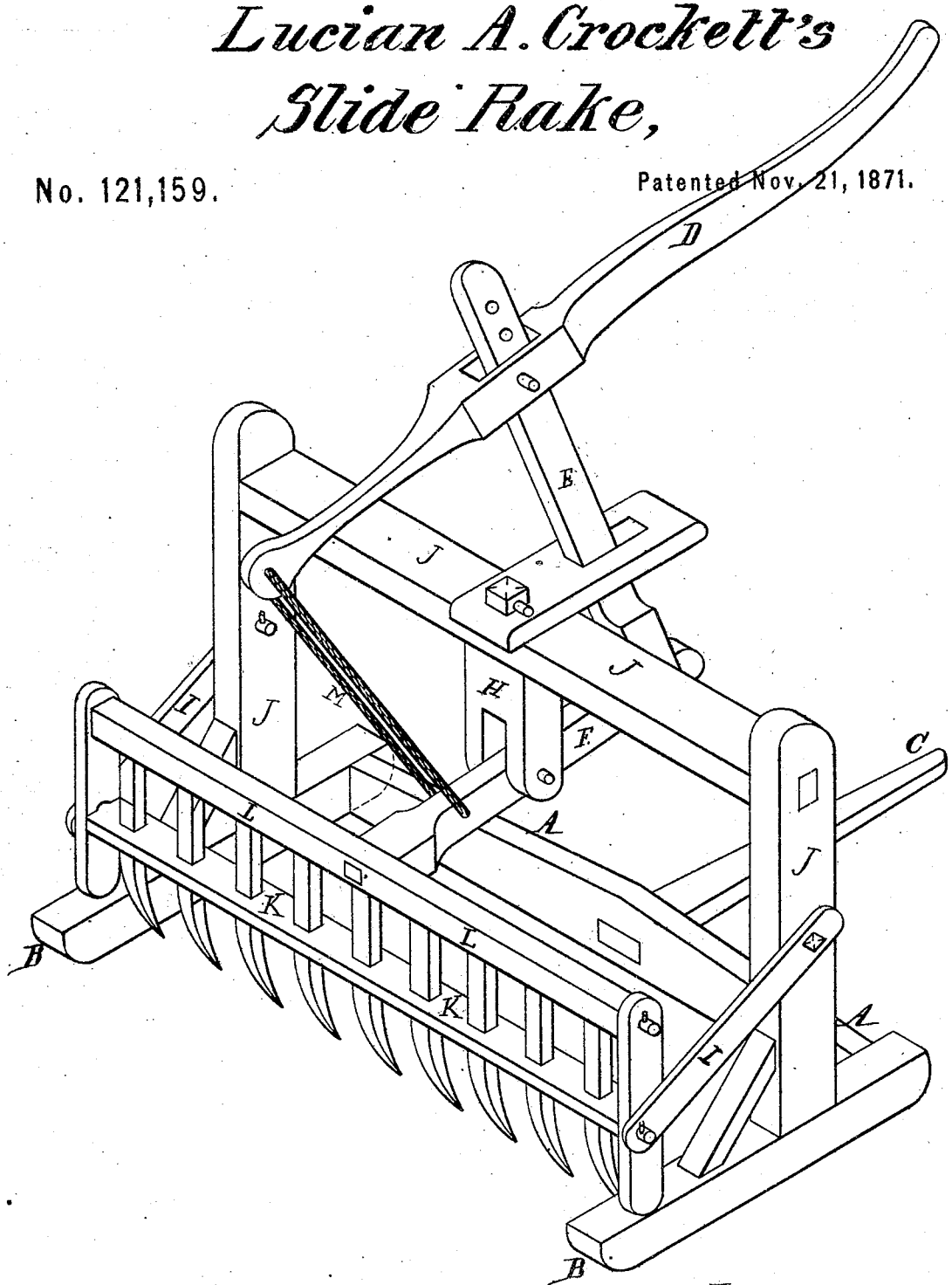

LUCIAN A. CROCKETT, OF WYTHE COUNTY, VIRGINIA.

IMPROVEMENT IN HORSE HAY-RAKES.

Specification forming part of Letters Patent No. 121,159, dated November 21, 1871.

*To all whom it may concern:*

Be it known that I, LUCIAN A. CROCKETT, of Wythe county, in the State of Virginia, have invented certain Improvements in Slide-Rakes, of which the following is a specification:

The nature of my invention consists in the arrangement of its several parts, as hereinafter more particularly shown and described.

The annexed drawing is a perspective view of my invention, in which A A are the draft-hooks to which the horses are attached to draw the rake which slides along on the rear ends of the runners B, which are shod with iron. The rake is thrown into proper working position by attaching the tongue C to a breast-yoke on the horses. D is the operating-lever, connected by arms E M to the handle F of the rake, which is pivoted in the bracket H depending from the frame J of the machine. I are arms pivoted to the uprights of the frame, serving to hold the rake. K is a rib or brace for the teeth L, to the extremities of which the arms I are attached. The connection E has holes in its upper end for adjusting the lever D.

The operation is as follows: The rake is thrown into working position and drawn forward, and when a sufficient quantity of material has been raked together it is discharged by the driver, who rides on one of the horses, depressing the lever D, which immediately elevates the rake, and the collected material falls to the ground. On releasing the lever the rake resumes its original position, ready for raking.

The invention can also be used for raking up grain, &c.

Having now fully described my invention, what I desire to secure by Letters Patent is—

An improved horse slide-rake, consisting of the runners B, frame J, arms I, rake K L, handle F pivoted in bracket H, lever D, and connections E M, all arranged as and for the purpose described.

LUCIAN $\overset{\text{his}}{\underset{\text{mark.}}{\times}}$ A. CROCKETT.

Witnesses:
S. C. GLEAVES,
A. G. STALNAKER.

(77)